US009162750B2

(12) United States Patent
Coupe et al.

(10) Patent No.: US 9,162,750 B2
(45) Date of Patent: Oct. 20, 2015

(54) AIRCRAFT PROPELLER BLADE

(75) Inventors: Dominique Coupe, Le Haillan (FR);
Bruno Jacques Gerard Dambrine, Le Chatelet en Brie (FR); Jean-Noel Mahieu, Paris (FR)

(73) Assignee: SNECMA, Paris (FR)

(*) Notice: Subject to any disclaimer, the term of this patent is extended or adjusted under 35 U.S.C. 154(b) by 705 days.

(21) Appl. No.: 13/517,410

(22) PCT Filed: Dec. 20, 2010

(86) PCT No.: PCT/FR2010/052829
§ 371 (c)(1),
(2), (4) Date: Sep. 19, 2012

(87) PCT Pub. No.: WO2011/083250
PCT Pub. Date: Jul. 14, 2011

(65) Prior Publication Data
US 2013/0017093 A1      Jan. 17, 2013

(30) Foreign Application Priority Data

Dec. 21, 2009   (FR) ..................................... 09 59285

(51) Int. Cl.
*B64C 11/20*   (2006.01)
*B64C 11/26*   (2006.01)
*F01D 5/28*   (2006.01)

(52) U.S. Cl.
CPC ................ *B64C 11/26* (2013.01); *F01D 5/282* (2013.01)

(58) Field of Classification Search
CPC ..... B64C 11/26; B29L 2031/08; B29C 70/24; B29C 70/222; F05D 2300/614; F05D 2300/6033
USPC ........... 416/229 R, 230, 241 A, 241 B, 241 R
See application file for complete search history.

(56) References Cited

U.S. PATENT DOCUMENTS

| 3,476,625 | A | 11/1969 | Slivinsky et al. |
| 3,484,174 | A | 12/1969 | McCoubrey et al. |
| 4,648,921 | A | 3/1987 | Nutter, Jr. |
| 5,269,658 | A * | 12/1993 | Carlson et al. ............ 416/229 R |
| 5,439,353 | A * | 8/1995 | Cook et al. .................... 416/230 |
| 2003/0156944 | A1 | 8/2003 | Rust |
| 2005/0084377 | A1 | 4/2005 | Dambrine et al. |
| 2006/0216154 | A1* | 9/2006 | McMillan ................. 416/241 R |
| 2006/0257260 | A1 | 11/2006 | Dambrine et al. |
| 2007/0007386 | A1 | 1/2007 | Coupe et al. |
| 2010/0014422 | A1 | 1/2010 | Lee et al. |

FOREIGN PATENT DOCUMENTS

| EP | 1 526 285 | 4/2005 |
| FR | 1 379 356 | 11/1964 |
| WO | 2006 136755 | 12/2006 |

OTHER PUBLICATIONS

International Search Report issued on May 6, 2011 in PCT/FR10/52829 filed on Dec. 20, 2010.

* cited by examiner

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

An aircraft propeller blade including an airfoil-profile structure. The airfoil-profile structure includes at least one fiber reinforcement obtained by three-dimensional weaving of yarns and densified by a matrix, and a shaping part made of cellular rigid material of determined shape, the reinforcement including at least two halves linked together by continuous weaving in the leading edge of the propeller blade, the two halves fitting tightly around the shaping part.

18 Claims, 10 Drawing Sheets

AIRCRAFT PROPELLER BLADE

BACKGROUND OF THE INVENTION

The present invention relates to the field of propeller blades for aircraft, such as the blades present on turboprops.

Propeller blades for turboprops are generally made of a metal material. Although propeller blades made of metal material present good mechanical strength, they nevertheless present the drawback of being relatively heavy.

In order to obtain propeller blades that are lighter, it is known to make propeller blades out of composite material, i.e. by making structural parts out of fiber reinforcement with a resin matrix.

The technique generally used consists in forming a stack of preimpregnated unidirectional sheets or plies (draping) that is placed in a mold with the successive plies being given different orientations, prior to compacting and polymerizing in an autoclave. An example of how a propeller blade can be made by that technique is described in particular in document U.S. Pat. No. 6,666,651.

That technique is very difficult and requires the ply stacking operations to be performed manually, which is lengthy and expensive. In addition, the stratified structure is not optimal, in particular concerning shocks or impacts that may give rise to delamination.

Document EP 1 526 285 describes a more effective method of fabricating a turbine engine blade out of composite material, the blade being fabricated by three-dimensionally weaving a fiber preform and densifying the preform with an organic matrix. That method makes it possible to obtain blades that present very great mechanical strength, in particular against shocks or impacts, without any risk of delamination. Nevertheless, propeller blades of large dimensions made using that technique still present relatively great weight. Unfortunately, in order to improve the performance of turboprops, in particular in terms of fuel consumption, it is desired to reduce weight.

OBJECT AND SUMMARY OF THE INVENTION

It is therefore desirable to be able to have propeller blades for aircraft that present smaller overall weight, while nevertheless having the required mechanical properties.

To this end, the invention provides an aircraft propeller blade having an airfoil-profile structure that comprises at least one fiber reinforcement obtained by three-dimensional weaving of yarns and densified by a matrix, and a shaping part made of cellular rigid material of determined shape, the reinforcement comprising at least two halves linked together by continuous weaving in the leading edge of the propeller blade, the two halves fitting tightly around said shaping part.

The propeller blade of the invention is both lighter in overall weight as a result of having a shaping part made of low density material, and also of great mechanical strength as a result of having a skin made of a composite material structure (fiber reinforcement densified by a matrix). The propeller blade also presents good ability to withstand shocks or impacts since the portion of the fiber reinforcement that constitutes the leading edge presents great cohesion in this location as a result of continuous weaving.

In an embodiment, the blade of the invention further comprises a beam having a first portion arranged inside the airfoil-profile structure and surrounded at least in part by the shaping part, and a second portion extending outside said structure, said second portion including a blade root at its end.

Preferably, the beam is formed by fiber reinforcement densified by a matrix.

The first portion of the beam may include an enlarged portion forming a retaining element for retaining the beam in the airfoil-profile structure.

In another embodiment, the propeller blade of the invention further comprises a blade root formed by fiber reinforcement densified by a matrix, the fiber reinforcement of the blade root being woven continuously with the fiber reinforcement of the airfoil-profile structure.

According to a characteristic of the invention, the two halves of the fiber reinforcement are partially separated by a non-interlinked region that is obtained during the three-dimensional weaving.

The two halves of the fiber reinforcement may include at least one stiffener-forming extra thickness on their facing faces.

The airfoil-profile structure may in particular comprise carbon fiber reinforcement densified by a carbon matrix.

The invention also provides a method of fabricating an aircraft propeller blade, the method comprising at least:

making a single-piece fiber blank by three-dimensional weaving of yarns, said blank comprising at least a first portion comprising at least two halves that are linked together by continuous weaving in the leading edge of the propeller blade;

forming a shaping part of determined shape and made of cellular rigid material;

shaping the fiber blank by containing the shaping piece between the two halves of the fiber blank in order to obtain a preform for an airfoil-profile structure; and densifying the preform with a matrix in order to obtain an airfoil-profile structure having fiber reinforcement constituted by said preform and densified by the matrix.

In an implementation, the method of the invention further includes making a beam by three-dimensionally weaving a fiber blank and by densifying said blank with a matrix in order to obtain a beam of composite material having fiber reinforcement densified by the matrix, said beam comprising a mast and a blade root, and during shaping of the fiber blank, placing the mast of the beam between the two halves of the fiber blank, said mast being surrounded at least in part by the shaping part.

The method may include forming at least one enlarged portion on the mast of the beam, said enlarged portion being made by varying the weight and/or the thread count of the yarns of the blank or by incorporating an insert during three-dimensional weaving.

In a variant embodiment of the beam, the fiber blank of the beam is woven in the form of a fiber strip, said strip being folded around an insert to form the blade root, a core part of cellular rigid material being inserted between the two folded-together portions of the fiber strip.

In another implementation of the invention, the fiber blank of the airfoil-profile structure further includes a second portion woven continuously with the first portion of said blank, and after densification, said second portion forms a blade root.

According to a characteristic of the invention, the two halves of the fiber blank are separated in part by forming a non-interlinked region during the three-dimensional weaving.

According to another implementation, the fiber blank is shaped by folding two halves of the fiber blank onto the shaping part.

The method may further comprise forming at least one stiffener-forming extra thickness on the facing faces of the two halves of the blank.

The invention also provides a turboprop fitted with a propeller blade of the invention.

The invention also provides an aircraft fitted with at least one turboprop of the invention.

BRIEF DESCRIPTION OF THE DRAWINGS

Other characteristics and advantages of the invention appear from the following description of particular embodiments of the invention, given as non-limiting examples, and with reference to the accompanying drawings, in which.

DETAILED DESCRIPTION OF EMBODIMENTS

The invention applies in general to various types of propeller blade used in the engines of aircraft such as airplanes or helicopters. The invention finds an application that is advantageous but not exclusive in propeller blades of large dimensions that, because of their size, present considerable weight and have a significant impact on the overall weight of the engine of the aircraft.

Figure 1:
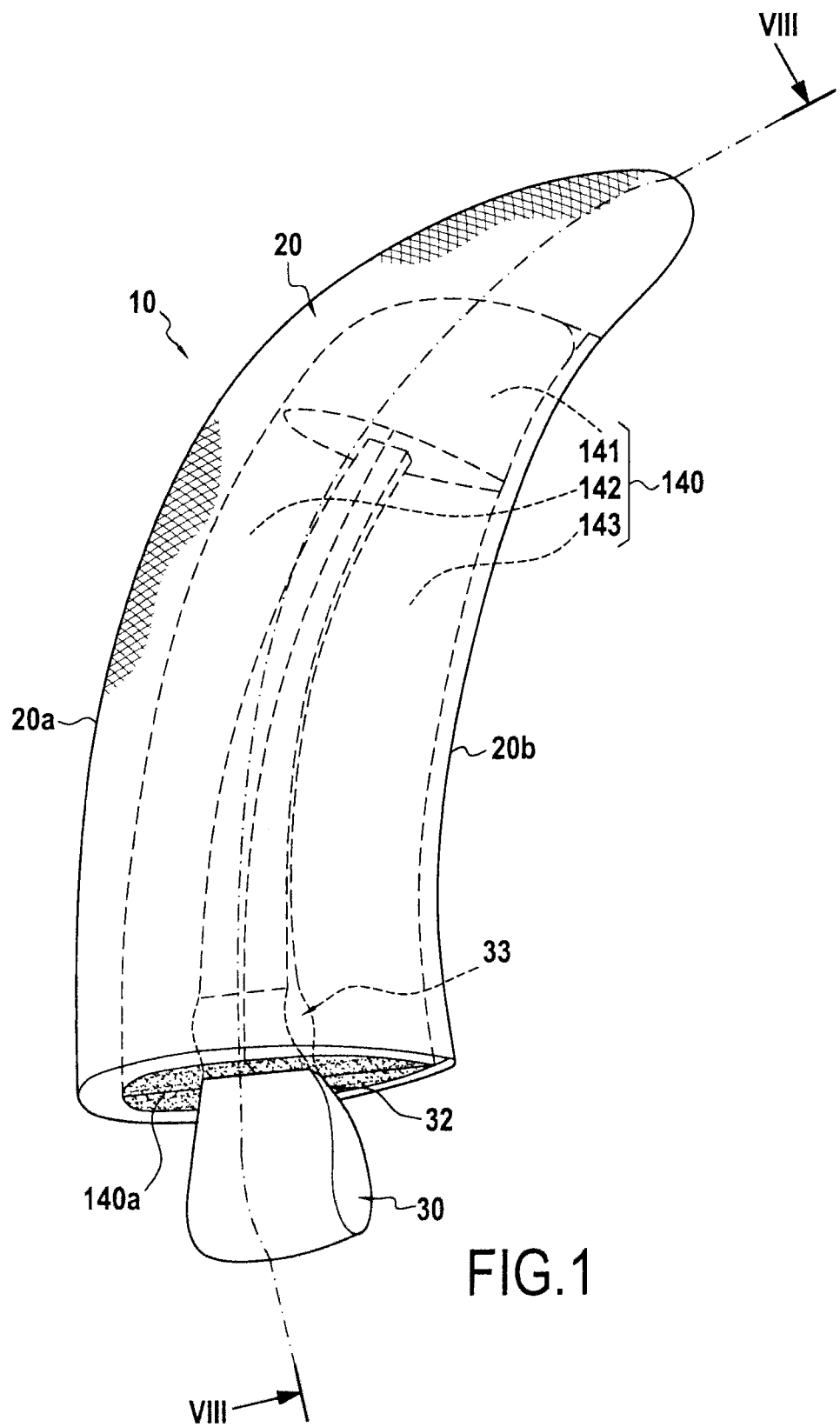
FIG. 1 is a perspective view of an aircraft propeller blade in accordance with an embodiment of the invention.

FIG. 1 shows a propeller blade 10 for mounting on an airplane turboprop, which propeller blade comprises, in well-known manner, an airfoil-profile structure 20 that is to form the airfoil portion of the blade, a root 30 formed by a thicker portion, e.g. having a bulb-shaped section extended by a tang 32. The airfoil-profile structure 20 presents, in cross-section, a curved profile of thickness that varies going from its leading edge 20a to its trailing edge 20b.

Figure 2:
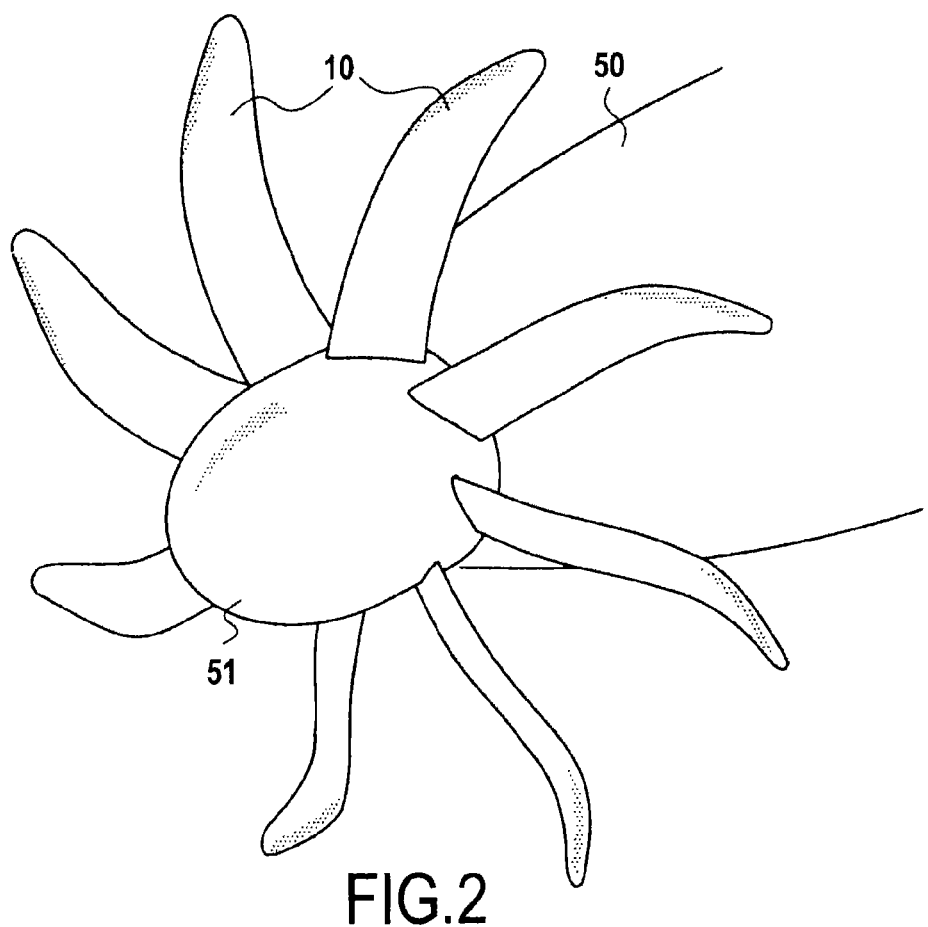
FIG. 2 is a perspective view of a turboprop fitted with a plurality of propeller blades of the invention.

As shown in FIG. 2, the blade 10 is mounted on a rotor 51 of a turboprop 50 by engaging the root 30 in a housing formed in the periphery of the rotor 51 (not shown in FIG. 2).

Figure 3:
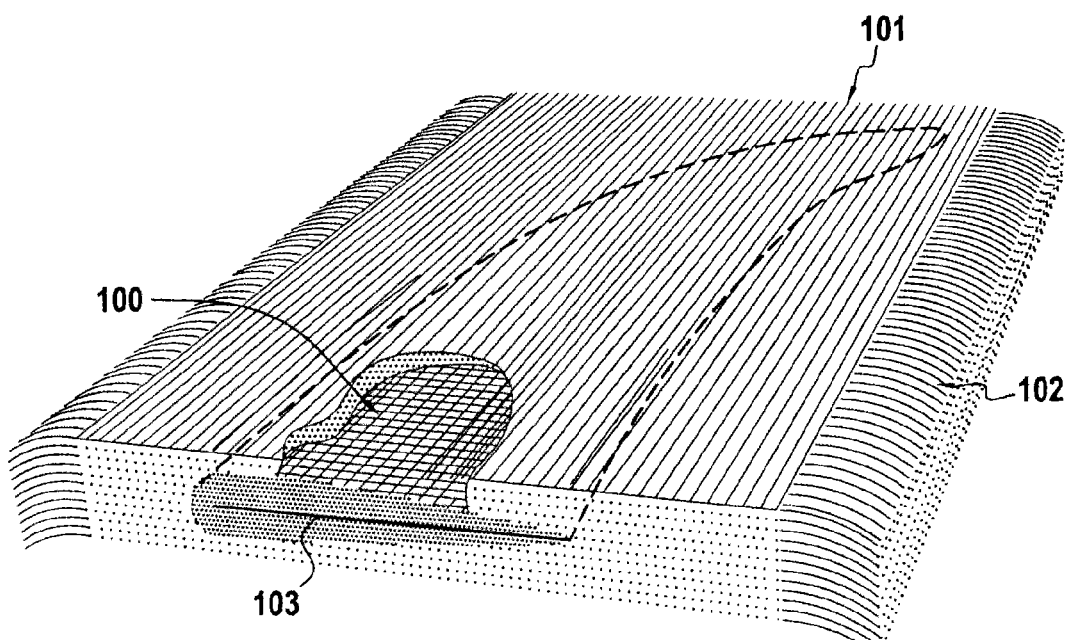
FIG. 3 is a diagrammatic view showing the three-dimensional (3D) weaving of a fiber blank for fabricating the FIG. 1 propeller blade.

FIG. 3 is a diagram showing a fiber blank 100 for forming the fiber preform of the blade airfoil-profile structure.

As shown diagrammatically in FIG. 3, the fiber blank 100 is obtained by 3D weaving performed in known manner on a Jacquard type loom having a bundle of warp yarns 101 or twisted strands in a plurality of layers each comprising several hundreds of yarns, the warp yarns being linked together by weft yarns 102.

In the example shown, the 3D weaving is performed using an "interlock" type weave. The term "interlock" type weave is used herein to designate a weave in which layer of weft yarns links together a plurality of layers of warp yarns with all of the yarns in a given weft column presenting the same movement in the weave plane.

Other types of known three-dimensional weaving could be used, for example as described in document WO 2006/136755, the content of which is incorporated herein by reference. That document describes in particular making single-piece reinforcing fiber structures by weaving for use in fabricating parts such as blades having a core made with a first type of weave and a skin made with a second type of weave, thereby enabling a part to be provided with both the mechanical and the aerodynamic properties that are expected for a part of that type.

The fiber blank of the invention may be woven from yarns made of carbon fiber or of ceramic, such as silicon carbide.

As weaving of the fiber blank of varying thickness and width progresses, certain numbers of warp yarns are not included in the weaving, thereby making it possible to define the continuously-varying thickness and outline that are desired for the blank 100. Document EP 1 526 285, the content of which is incorporated herein by reference, describes an example of 3D weaving that varies as weaving progresses so as to make it possible, in particular, to cause the thickness of the blank to vary between a first edge that is to form the leading edge and a second edge of smaller thickness that is to form the trailing edge.

Figure 5:
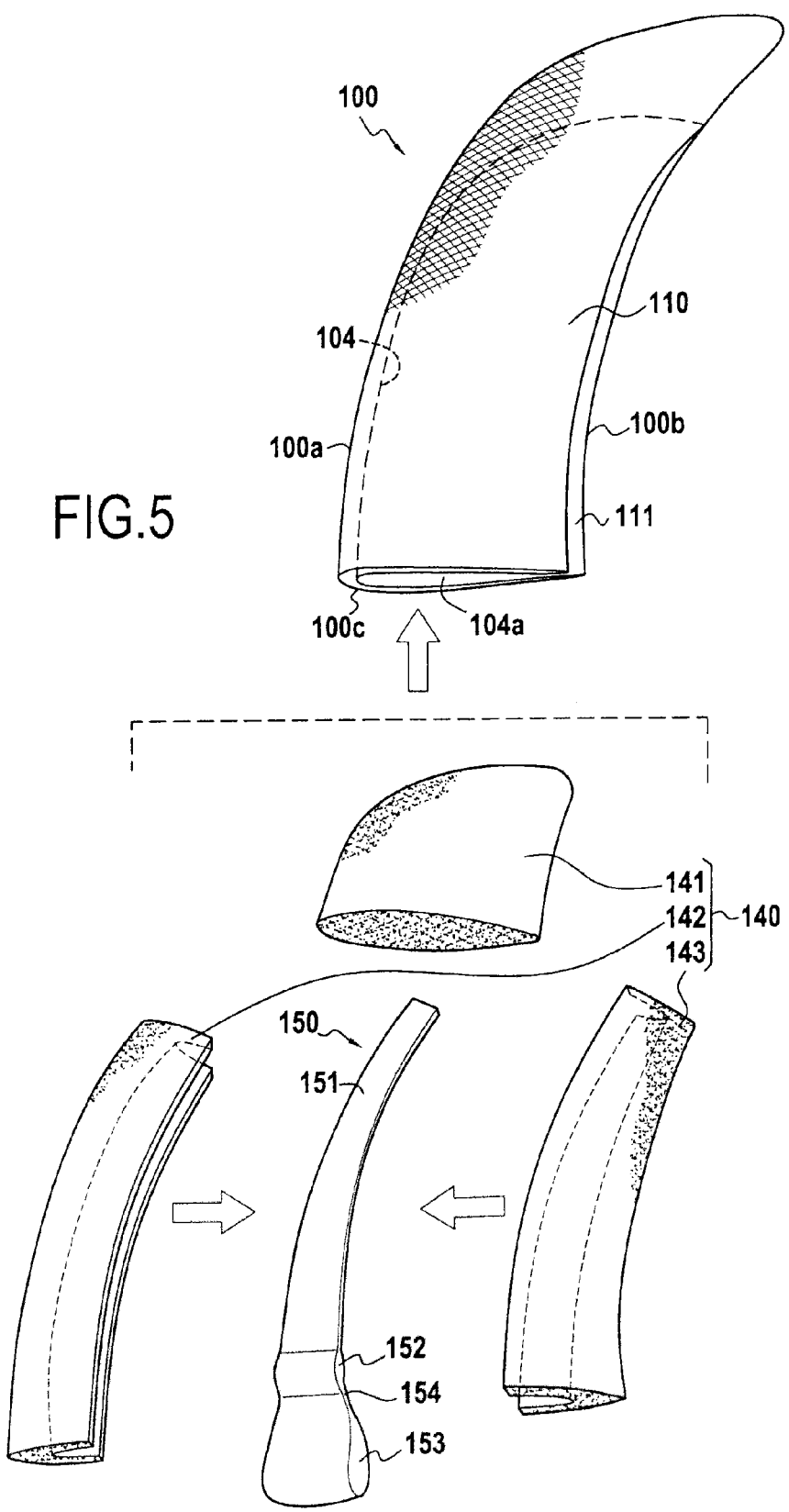
FIG. 5 is an exploded view showing how the FIG. 1 propeller blade is made.

During weaving, a line 103 of non-interlinking (FIG. 3) is organized inside the fiber blank between two successive layers of warp yarns, with this extending over a region 104 of non-interlinking (FIG. 5). The non-interlinked region 104 serves to provide a cavity 104a that enables a shaping part, possibly a beam, to be inserted inside the fiber blank 100 in order to form the preform of the airfoil-profile structure.

Figure 4B:
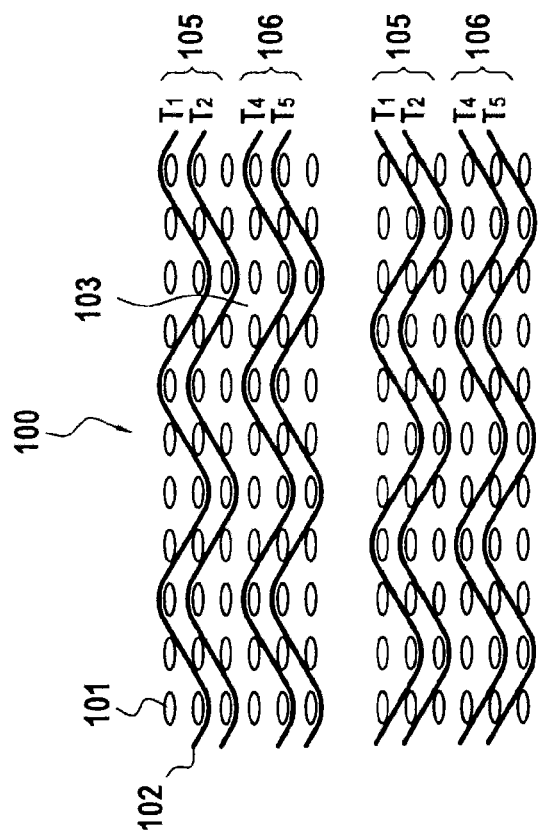
FIGS. 4A and 4B are fragmentary section views on a larger scale of a set of yarn layers forming the FIG. 3 blank.
Figure 4A:
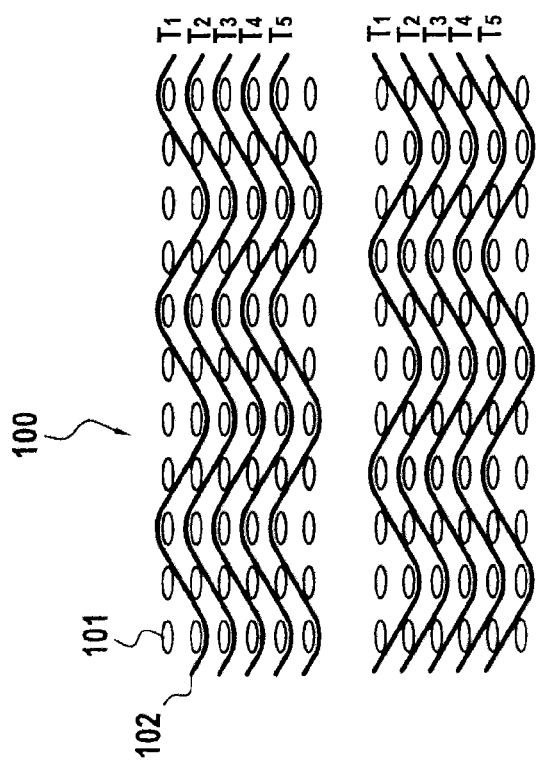

One way of making the blank 100 with a 3D interlock weave is shown diagrammatically in FIGS. 4A and 4B. FIG. 4A is an enlarged fragmentary view showing two successive warp section planes in a portion of the blank 100 that does not present non-interlinking, i.e. in a region of the blank that does not lie in the non-interlinked region 104, whereas FIG. 4B shows two successive warp section planes in a portion of the blank 100 that presents a line 103 of non-interlinking that forms part of the non-interlinked region 104.

In this example, the blank 100 has six warp yarn layers 101 extending in the X direction. In FIG. 4A, the six warp yarn layers are linked together by weft yarns $T_1$ to $T_5$. In FIG. 4B, three warp yarn layers 101 forming the set of yarn layers 105 are linked together by two weft yarns $T_1$, $T_2$, as are the three warp yarn layers forming the set of yarn layers 106 that are linked together by two weft yarns $T_4$ and $T_5$. In other words, the fact that the weft yarns $T_1$, $T_2$ do not extend in the yarn layers 106 and the weft yarns $T_4$, $T_5$ do not extend in the yarn layers 105 ensures that there is a line 103 of non-interlinking that separates the sets of warp yarn layers 105 and 106 from each other.

At the end of weaving (FIG. 3), the warp and weft yarns at the boundary of the woven mass are cut away, e.g. by using a jet of water under pressure, in order to extract the blank 100, which is shown in FIG. 5 as it appears after 3D weaving and before any shaping. The non-interlinked region 104 that was provided during weaving serves to form two halves 110 and 111 that are woven independently of each other and that define the cavity 104a inside the blank 100. The cavity 104a is open to the bottom edge 100c and to the rear edge 100b of the blank 100. The rear edge 100b of the blank 100 corresponds to the portion that is to form the trailing edge 20b of the airfoil-profile structure 20 (FIG. 1).

In accordance with the invention, the front edge 100a of the fiber blank 100, connecting together the two halves 110 and 111 and that is to form the leading edge 20a of the airfoil-profile structure of the propeller blade, does not include any non-interlinking. By connecting together the two halves 110 and 111 by continuous weaving in the leading edge 100a, the airfoil-profile structure of the propeller blade has fiber reinforcement that is uniform in its leading edge, thereby reinforcing its ability to withstand impacts, if any.

In FIG. 5, the fiber blank 100 is shaped to constitute a preform for the airfoil-profile structure by inserting a shaping part of rigid material 140 into the cavity 104a, which part is constituted in this example by three complementary elements 141, 142, and 143. In order to shape the blank 100 without significantly increasing the overall weight of the airfoil-profile structure of the propeller blade, the part 140 is made of a cellular rigid material, i.e. a material of low density. The shaping part, or more precisely in the example described the elements 141 to 143, may be made by molding or by machining a block of material.

The shaping part 140 is of a shape corresponding to the shape of the airfoil-profile structure that is to be made. In particular, in its anterior portion 140a (FIG. 1) it includes a rounded end suitable for constituting the leading edge 20a with a radius of curvature that is sufficiently large to obtain good impact resistance and to avoid the appearance of cracks.

A beam 150 is also inserted inside the cavity 104a between the three elements 141, 142, and 143. The beam 150 comprises a mast 151 with first and second enlarged portions 152 and 153. The first enlarged portion 152 is for acting in a manner described below to form an element for retaining the beam in the fiber reinforcement of the airfoil-profile structure, while the second enlarged portion 153 is for forming the root 30 of the propeller blade 10 (FIG. 1), the portion 154 that is situated between the enlarged portions 152 and 153 serving to form the tang 32 of the blade (FIG. 1).

Once the elements 141 to 143 and the beam 150 have been inserted into the cavity 104a, the fiber preform of the airfoil-profile structure is densified. The rear edge 100b and the bottom edge 100c of the blank are preferably closed by stitching before performing densification.

Densification of the fiber preform consists in filling the pores of the preform, in all or part of its volume, with the material that is to constitute the matrix.

The matrix of the composite material constituting the airfoil-profile structure may be obtained in known manner using the liquid technique.

The liquid technique consists in impregnating the preform with a liquid composition containing an organic precursor for the material of the matrix. As a general rule, the organic precursor is in the form of a polymer, such as a resin, possibly diluted in a solvent. The preform is placed in a mold suitable for being closed in leaktight manner and having a recess that has the shape of the molded finished part and that may in particular present a shape that is twisted, corresponding to the final shape for the airfoil-profile structure. Thereafter, the mold is closed and the liquid precursor for the matrix (e.g. a resin) is injected throughout its entire recess in order to impregnate all of the fiber portion of the preform.

The precursor is transformed into an organic matrix, i.e. it is polymerized, by performing heat treatment, generally by heating the mold, after eliminating any solvent and curing the polymer, with the preform continuing to be held in the mold that has a shape corresponding to the shape to be given to the airfoil-profile structure. The organic matrix may in particular be obtained from epoxy resins, such as the high-performance epoxy resin sold under the reference PR 520 by the supplier CYTEC, or liquid precursors for carbon or ceramic matrices.

When forming a carbon or ceramic matrix, the heat treatment consists in pyrolyzing the organic precursor in order to transform the organic matrix into a carbon or ceramic matrix depending on the precursor used and on the pyrolysis conditions. By way of example, liquid precursors for carbon may be resins having a relatively high coke content, such as phenolic resins, whereas liquid precursors for ceramics, in particular SiC, may be resins of the polycarbosilane (PCS) type or of the polytitanocarbosilane (PTCS) type, or of the polysilazane (PSZ) type. Several consecutive cycles from impregnation to heat treatment may be performed in order to achieve a desired degree of densification.

In an aspect of the invention, the fiber preform may be densified by the method known as resin transfer molding (RTM). In the RTM method, the fiber preform including the beam 150 and the elements 141 to 143 making up the shaping part 140 is placed in a mold having the outside shape of the airfoil-profile structure. Since the shaping piece 140 is made of rigid material and has a shape that corresponds to the shape of the airfoil-profile structure that is to be made, it advantageously acts as a countermold. A thermosetting resin is injected into the inside space defined between the rigid material part and the mold and that includes the fiber preform. A pressure gradient is generally established in this inside space between the location where the resin is injected and orifices for evacuating the resin, for the purpose of controlling and optimizing the manner in which the preform is impregnated by the resin.

By way of example, the resin used may be an epoxy resin. Resins suitable for RTM methods are well known. They preferably present low viscosity so as to facilitate being injected among the fibers. The temperature class and/or the chemical nature of the resin is/are selected as a function of the thermomechanical stresses to which the part is to be subjected. Once the resin has been injected throughout the reinforcement, it is polymerized by heat treatment in accordance with the RTM method.

After injection and polymerization, the part is unmolded. The part is trimmed in order to remove excess resin, and the chamfers are machined. No other machining is required since, given that the part is molded, it complies with the required dimensions.

The cellular rigid material used for making the elements 141 to 143 constituting the shaping part 140 is preferably a material having cells that are closed so as to prevent the resin from penetrating therein, thereby conserving its low density after the fiber preform has been densified.

The beam 150 is made of composite material. Like the airfoil-profile structure, a fiber blank is made initially by 3D weaving, e.g. using a 3D interlock weave. During the weaving of the fiber blank of the beam, the first and second enlarged portions 152 and 153 may be obtained by using weft yarns of greater weight and by using additional layers of weft yarns, as shown for example in FIG. 6.

Figure 6:
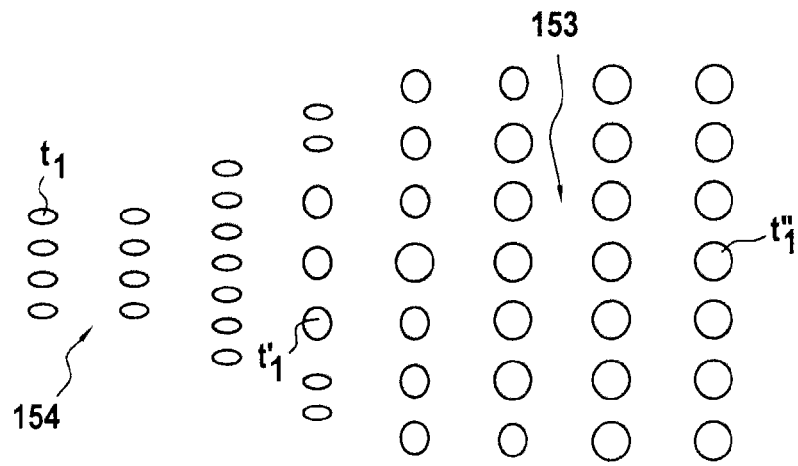
FIG. 6 is a weft section view showing an example arrangement of weft yarns in a fiber blank portion corresponding to a blade root portion.

In FIG. 6, the number of weft yarns goes in this example from four to seven between the portion 154 of the strip of the fiber blank that corresponds to the tang of the propeller blade, and the second enlarged portion 153 of the strip that corresponds to the blade root. In addition, use is made of weft yarns $t_1$, $t'_1$, $t''_1$ that are of differing (increasing) weights. The first enlarged portion 152 corresponding to the retaining element may be made in the same manner. In a variant or in addition, it is also possible to vary the thread count of the warp yarns (i.e. the number of yarns per unit length in the weft direction).

In a variant embodiment, the first and second enlarged portions 152 and 153 may be obtained by inserting inserts while weaving the strip of the fiber blank for the beam 150. Such an insert may be made in particular out of titanium or out of the same material as constitutes the matrix of the composite material of the beam.

Once the fiber blank of the beam has been made, it is densified by an organic matrix that may be deposited by using a liquid technique as described above, and in particular by impregnation and polymerization in a shaping tool or by RTM.

Figure 7A:
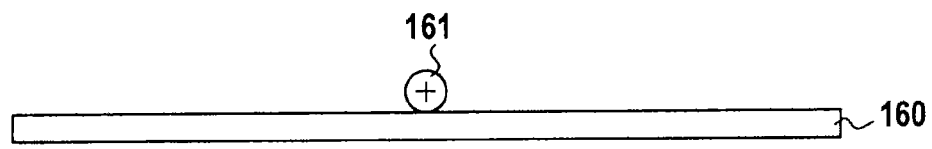
FIGS. 7A to 7C show how a beam is made in accordance with an implementation of the invention.
Figure 7B:
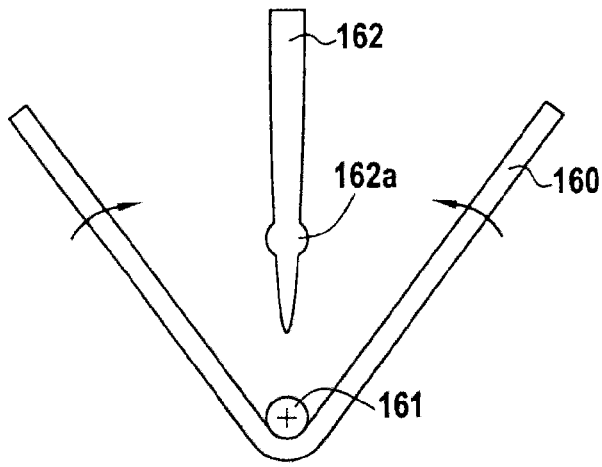
Figure 7C:
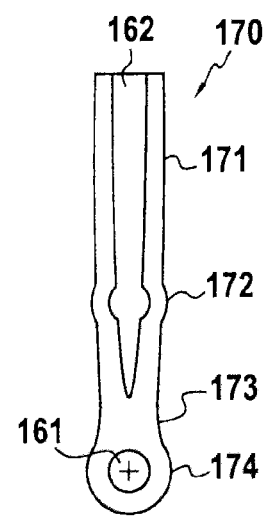

FIGS. 7A to 7C show a variant embodiment of the beam of the invention. In this variant, use is made of a fiber blank 160 that is obtained by interlock type three-dimensional weaving, for example. An insert 161 is placed in the center of the strip of the blank 200 (FIG. 7A). The strip is then folded in half about the insert 161 with a core part 162 being inserted between the two folded strip portions (FIG. 7B). The insert 161 enables an enlarged portion to be formed that is to constitute the blade root. Like the shaping part 140, the core part 162 is made of cellular rigid material so as to reduce the overall weight of the beam. As shown in FIG. 7B, the core part may include an enlarged portion 162a that is to form the retaining element of the beam. Once the strip of the blank 160 has been folded onto the insert 161 and the core part 162, it is densified using the liquid technique as described above for the preform of the airfoil-profile structure.

As shown in FIG. 7C, a beam 170 is then obtained that has a core of low density and that comprises a mast 171, a first enlarged portion 172 corresponding to the retaining element of the beam, a portion 173 corresponding to the tang of the propeller blade, and a second enlarged portion 174 corresponding to the root of the blade.

Figure 8:
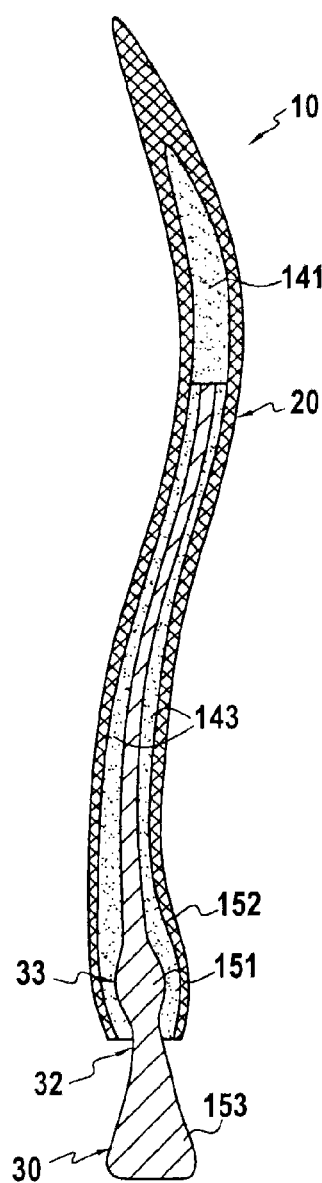
FIG. 8 is a section view of the FIG. 1 propeller blade.

After densifying the fiber preform for the airfoil-profile structure, a propeller blade 10 is obtained as shown in FIG. 1 that comprises an airfoil-profile structure 20 that is made out of composite material (fiber reinforcement densified with a matrix), a shaping part 140 of cellular rigid material, and a beam 150 of composite material. As shown in FIG. 8, the first enlarged portion 151 of the beam 150 is engaged between the two elements 142 and 143 of the shaping part 140 (FIG. 1) which are themselves enclosed within the densified airfoil-profile structure 20. The enlarged portion 151 thus constitutes a (self-locking) retaining element 33 for retaining the airfoil-profile structure on the beam 150, thereby reinforcing the connection between said structure and the root of the propeller blade. It should be observed that the beam 150 may also be made without a retaining element.

Figure 9:
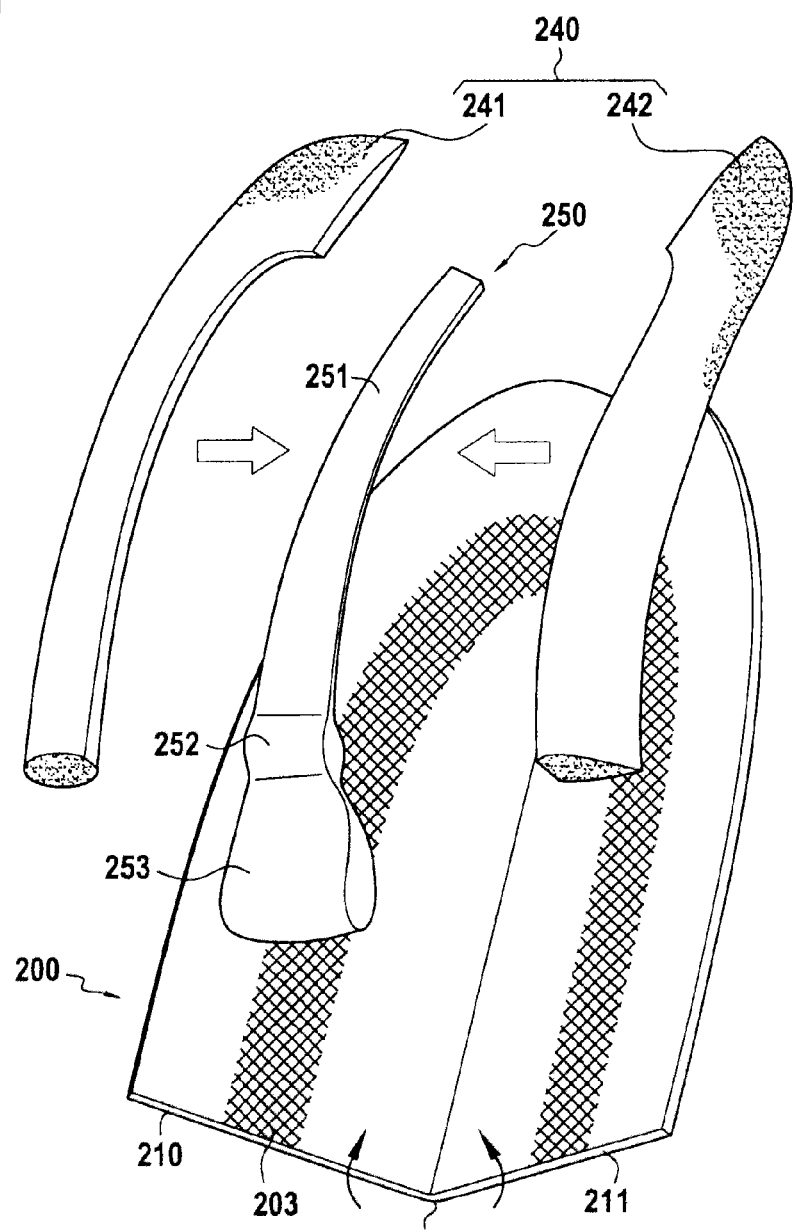
FIG. 9 is an exploded view showing how an aircraft propeller blade is made in accordance with another implementation of the invention.

FIG. 9 shows another embodiment of an aircraft propeller blade of the invention. In this embodiment, a fiber blank 200 is made that corresponds to developing the airfoil-profile structure of the propeller blade. As shown diagrammatically in FIG. 10, the fiber blank 200 is obtained by 3D weaving, e.g. of the interlock type, between warp yarns 201 or twisted strands arranged in a plurality of layers, each comprising several hundreds of yarns, and weft yarns 202. During weaving of the blank that is of varying thickness and width, a certain number of warp yarns are not involved in the weaving, thereby making it possible to define the continuously-varying outline and thickness that are desired for the blank 200. In this example, in addition to the overall thickness of the blank, weaving is controlled so as to form extra thickness 203 on one face of the blank. The extra thickness 203 is to constitute a stiffener in the airfoil-profile structure.

Figure 10:
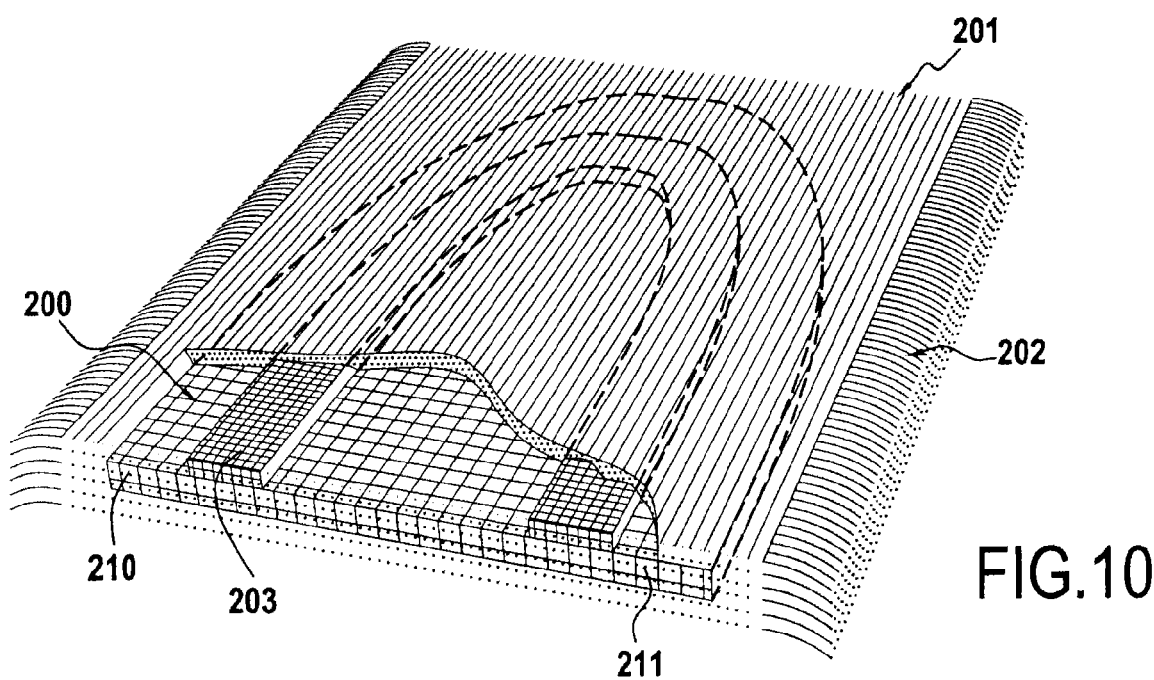
FIG. 10 is a diagrammatic view showing the 3D weaving of a fiber blank for fabricating the FIG. 11 propeller blade.

Once the blank has been woven, the warp and weft yarns that are not woven are cut away so as to obtain the fiber blank as shown in FIG. 10. Two elements 241 and 242 made of a cellular rigid material of the same kind as that of the above-described elements 141 to 143 are assembled together to form a shaping part 240 of a determined shape that corresponds to the shape of the airfoil-profile structure that is to be made. The two elements 241 and 242 are disposed on either side of a beam 250 similar to the above-described beam 150 and comprising a mast 251, a first enlarged portion 252 that is to form an element for retaining the beam in the fiber reinforcement of the airfoil-profile structure, as described below, and a second enlarged portion 253 that is to form the root of the propeller blade.

The fiber blank presents two symmetrical halves 210 and 211 that are connected together by continuous weaving in a fold line 200a that is to form the leading edge of the airfoil-profile structure of the propeller blade.

The two elements 241 and 242 of the beam 250 are placed on one of the two halves 210 and 211, e.g. the half 211, with the other half that is left free, here the half 210, then being folded onto the half 211. The fiber preform of the airfoil-profile structure is then densified using the liquid technique as described above.

Figure 11:
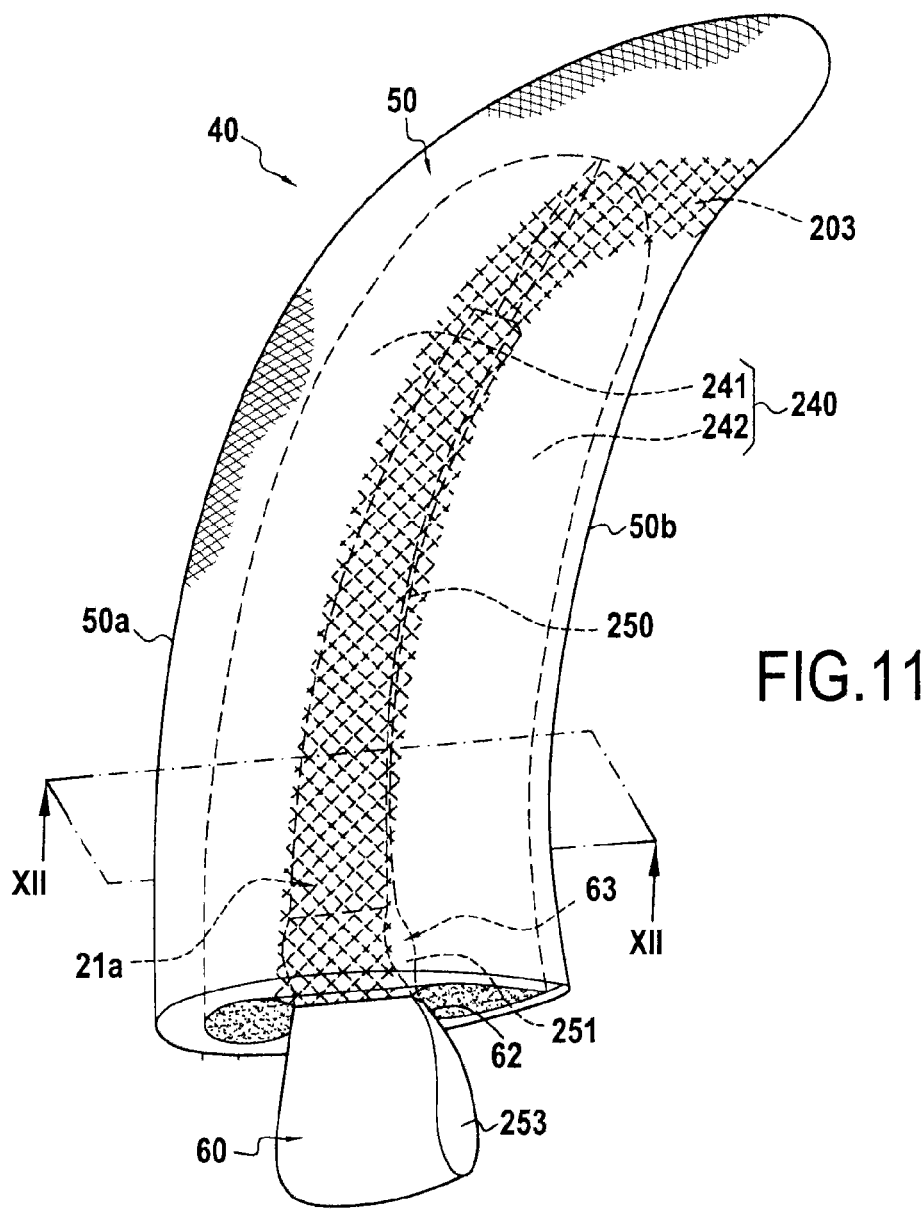
FIG. 11 is a perspective view showing a propeller blade obtained from elements shown in FIG. 9.
Figure 12:
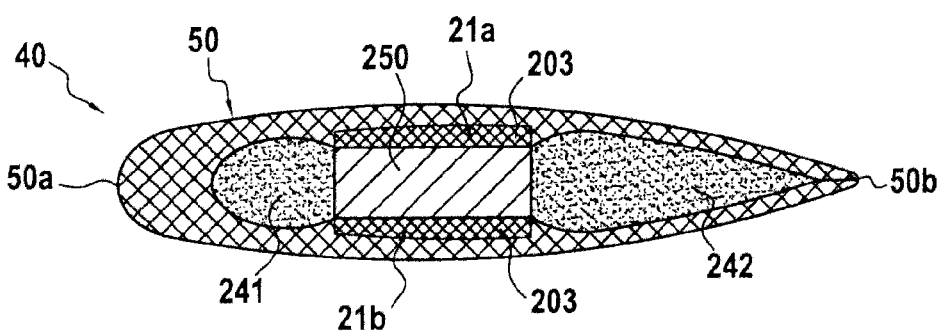
FIG. 12 is a section view of the FIG. 11 propeller blade.

As shown in FIGS. 11 and 12, a propeller blade 40 is then obtained that has an airfoil-profile structure 50 that is made of composite material (fiber reinforcement densified with a matrix), having a leading edge 50a and a trailing edge 50b, a shaping part 240 of cellular rigid material, and a beam 250 made of composite material. The first enlarged portion 251 of the beam 250 is engaged between the two elements 241 and 242 of the shaping part 240, which are themselves tightly fitted in the densified airfoil-profile structure 50. The enlarged portion 251 thus constitutes a (self-locking) retaining element 63 for retaining the airfoil-profile structure on the beam 250, thereby reinforcing the connection between said structure and the root of the propeller blade. It should be observed that the beam 150 may also be made without a retaining element. The portion of the beam 250 that extends beyond the airfoil-profile structure 50 comprises a tang 62 extended by a root 60 that is formed by the second enlarged portion 253 of the beam 250.

The extra thickness 203 formed during the weaving of the fiber blank 200 forms two stiffeners 21a and 21b arranged on either side of the beam 250. The number and positions of the stiffeners are not restricted to the stiffeners 21a and 21b shown in FIGS. 11 and 12. Depending on requirements in terms of stiffness and/or impact behavior, other stiffeners may be formed in the airfoil-profile structure. The positions, shapes, and number of stiffeners are defined during weaving of the fiber blank for the airfoil-profile structure, in the manner described above.

In accordance with the invention, it should be observed that the leading edge 50a corresponds to the fold line connecting together the two halves 210 and 211 of the fiber blank. Thus, the airfoil-profile structure 50 of the propeller blade 40 presents a continuous woven connection in the leading edge so as to reinforce its impact strength.

Figure 13:
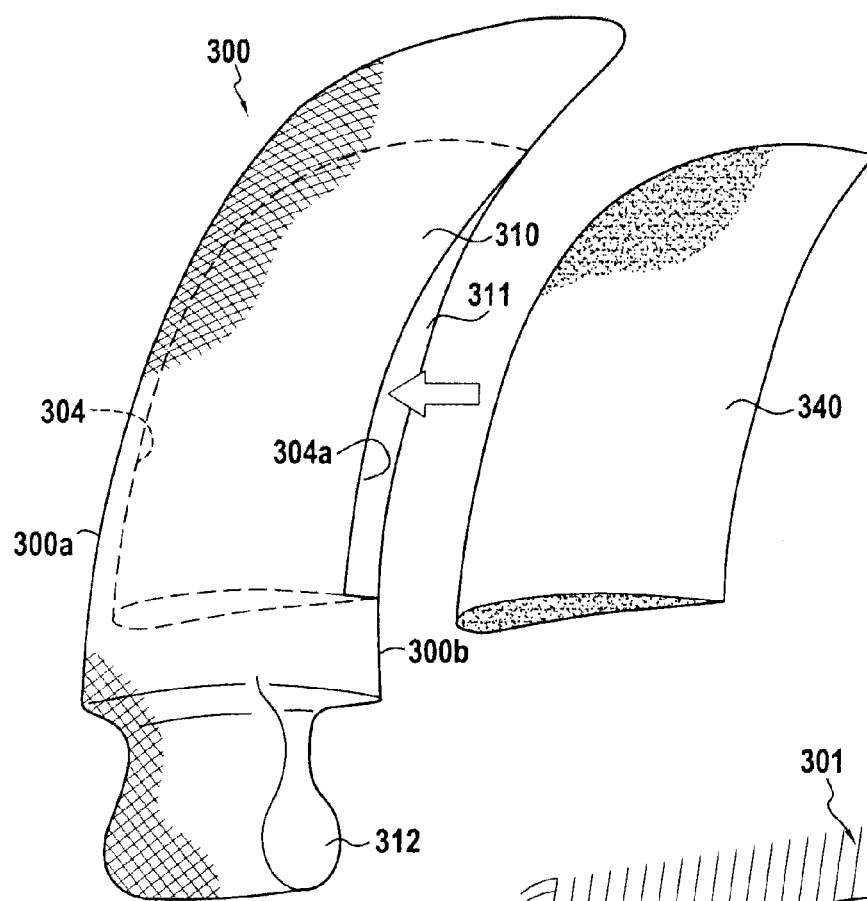
FIG. 13 is an exploded view showing how an aircraft propeller blade is made in accordance with another implementation of the invention.

FIG. 13 shows yet another embodiment of an aircraft propeller blade of the invention. In this embodiment, a fiber blank 300 is made that comprises, in a single woven part, both a first portion 310 that is to form the airfoil-profile structure of the propeller blade, and also a second portion 312 that is to form the blade root.

Figure 14:
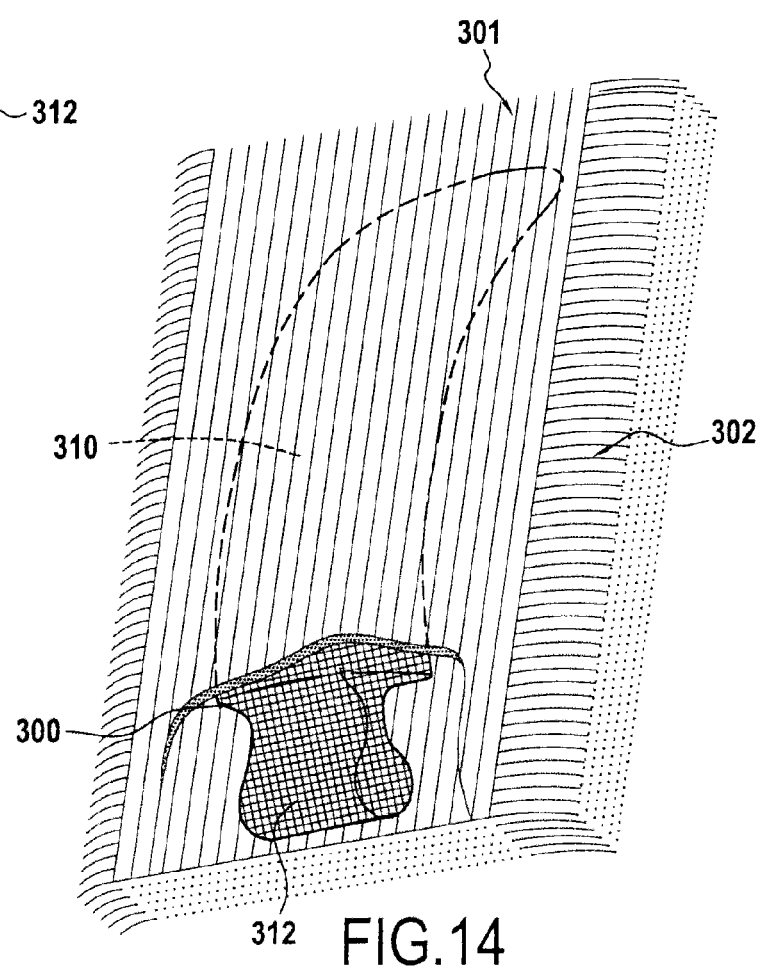
FIG. 14 is a diagrammatic view showing the 3D weaving of a fiber blank for fabricating the FIG. 15 propeller blade.

As shown diagrammatically in FIG. 14, the fiber blank 300 is obtained by 3D weaving, e.g. of the interlock type, between warp yarns 301 or twisted strands arranged in a plurality of layers each having several hundreds of yarns, and weft yarns 302. During weaving of the blank that is of varying thickness and width, a certain number of warp yarns are not involved in the weaving, thereby defining the continuously-varying outline and thickness that are desired for the blank 300. Document EP 1 526 285, the content of which is incorporated herein by reference, describes making a fiber blank for a turbine engine blade by 3D weaving, the blank having a first portion made with a first weave to form a blade airfoil, here corresponding to the first portion 310 that is to form the airfoil-profile structure, and a second portion made with a second weave to form the blade root, here corresponding to the second portion 312 that is to form the blade root.

During weaving, and as explained above with reference to FIGS. 3, 4A, and 4B for the fiber blank 100, two successive layers of warp yarns are not interlinked inside the fiber blank over a non-interlinked region 304 (FIG. 13) serving to provide a cavity 304a that enables a shaping part 340 of cellular rigid material to be inserted inside the fiber blank 300 in order to form the preform for the airfoil-profile structure.

The second portion 312 of the fiber blank presents an enlarged shape in order to form the blade root. As described above for the beam 150, the portion 312 may be obtained by using weft yarns of greater weight and by using additional layers of weft yarns. In a variant, or in addition, it is possible to vary the thread count of the warp yarns (i.e. the number of yarns per unit length in the weft direction). It is also possible to incorporate an insert during weaving of the fiber blank.

Figure 15:
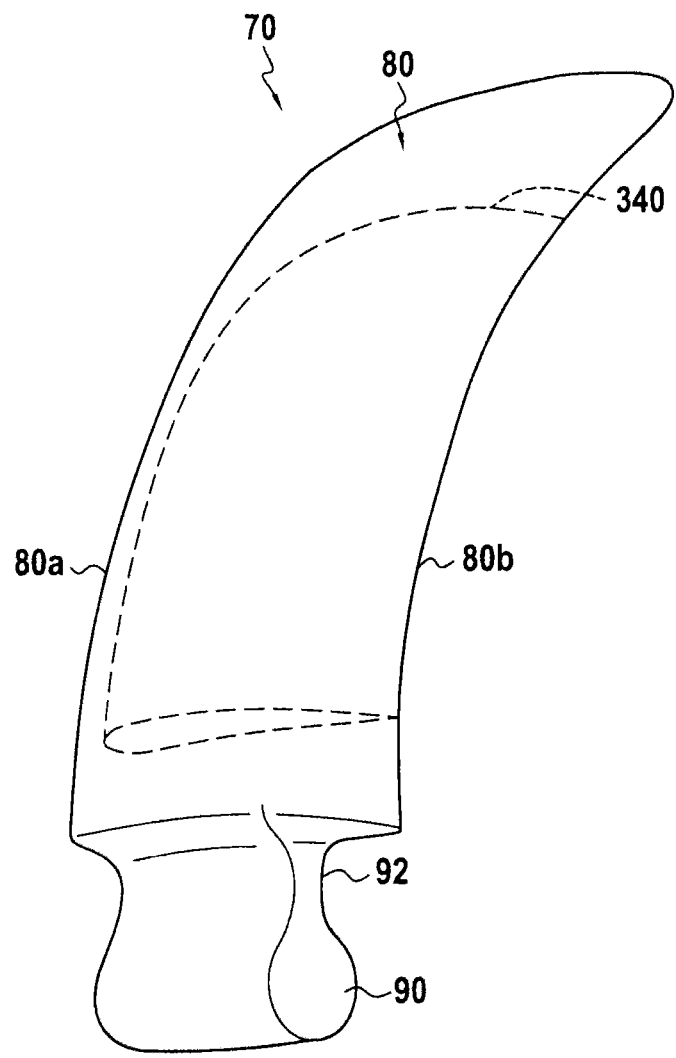
FIG. 15 is a perspective view showing a propeller blade obtained from the elements shown in FIG. 13.

Once weaving has been completed, the warp and weft yarns at the boundary of the woven mass are cut away, e.g. by a jet of water under pressure in order to extract the blank 300 which is shown in FIG. 13 as it appears after 3D weaving and before any shaping. The non-interlinked region 304 formed during the weaving serves to form two halves 310 and 311 that are woven independently of each other and that define the cavity 304a inside the blank 300. The cavity 304a is open to the rear edge 300b of the blank 300 that corresponds to the portion that is to form the trailing edge 80b of the airfoil-profile structure 80 (FIG. 15).

In accordance with the invention, the front edge 300a of the fiber blank 300, connecting together the two halves 310 and 311 and that is to form the leading edge 80a (FIG. 15) of the airfoil-profile structure of the propeller blade does not include any non-interlinked region. By connecting together the two halves 310 and 311 by continuous weaving in the front edge 100a, the airfoil-profile structure of the propeller blade includes fiber reinforcement that is uniform in the leading edge in order to increase its strength against possible impacts.

In FIG. 13, the fiber blank 300 is shaped to form a preform of the airfoil-profile structure by inserting a shaping part 340 of cellular rigid material into the cavity 304a.

Once the shaping part has been inserted into the cavity 304a, the fiber preform for the airfoil-profile structure is densified as described above.

As shown in FIG. 15, this produces a propeller blade 70 comprising a single piece of composite material (fiber reinforcement densified by a matrix), with an airfoil-profile structure 80 having a leading edge 80a and a trailing edge 80b, a tang 92, and a root 90. The shaping part 240 of cellular rigid material is also present inside the airfoil-profile structure.

The invention claimed is:

1. An aircraft propeller blade comprising:
an airfoil-profile structure,
wherein the airfoil-profile structure comprises at least one fiber reinforcement obtained by three-dimensional weaving of yarns and densified by a matrix, and a shaping part made of cellular rigid material of determined shape,
the reinforcement comprising at least two halves linked together by continuous weaving in a leading edge of the propeller blade, the two halves fitting tightly around the shaping part.

2. A blade according to claim 1, further comprising a beam having a first portion arranged inside the airfoil-profile structure and surrounded at least in part by the shaping part, and a second portion extending outside the structure, the second portion including a blade root at its end.

3. A blade according to claim 2, wherein the beam is formed by fiber reinforcement densified by a matrix.

4. A blade according to claim 2, wherein the first portion of the beam includes an enlarged portion forming a retaining element for retaining the beam in the airfoil-profile structure.

5. A blade according to claim 1, further comprising a blade root formed by fiber reinforcement densified by a matrix, the fiber reinforcement of the blade root being woven continuously with the fiber reinforcement of the airfoil-profile structure.

6. A blade according to claim 1, wherein the two halves of the fiber reinforcement are partially separated by a non-interlinked region that is obtained during the three-dimensional weaving.

7. A blade according to claim 1, wherein the two halves of the fiber reinforcement include at least one stiffener-forming extra thickness on their facing faces.

8. A blade according to claim 1, wherein the airfoil-profile structure comprises carbon fiber reinforcement densified by a carbon matrix.

9. A turboprop fitted with a propeller blade according to claim 1.

10. An aircraft comprising at least one turboprop according to claim 9.

11. A method of fabricating an aircraft propeller blade, the method comprising:
making a single-piece fiber blank by three-dimensional weaving of yarns, the blank comprising at least a first portion comprising at least two halves that are linked together by continuous weaving in a leading edge of the propeller blade;
forming a shaping part of determined shape and made of cellular rigid material;
shaping the fiber blank by containing the shaping part between the two halves of the fiber blank to obtain a preform for an airfoil-profile structure; and
densifying the preform with a matrix to obtain an airfoil-profile structure having fiber reinforcement constituted by the preform and densified by the matrix.

12. A method according to claim 11, further comprising making a beam by three-dimensionally weaving a fiber blank and by densifying the blank with a matrix to obtain a beam of composite material having fiber reinforcement densified by the matrix, the beam comprising a mast and a blade root, and during shaping of the fiber blank, placing the mast of the beam between the two halves of the fiber blank, the mast being surrounded at least in part by the shaping part.

13. A method according to claim 12, further comprising forming at least one enlarged portion on the mast of the beam, the enlarged portion being made by varying weight and/or thread count of the yarns of the blank or by incorporating an insert during three-dimensional weaving.

14. A method according to claim 12, wherein the fiber blank of the beam is woven in a form of a fiber strip, the strip being folded around an insert to form the blade root, a core part of cellular rigid material being inserted between the two folded-together portions of the fiber strip.

15. A method according to claim 11, wherein the fiber blank further includes a second portion woven continuously with the first portion of the blank, and wherein, after densification, the second portion forms a blade root.

16. A method according to claim 11, wherein the two halves of the fiber blank are separated in part by forming a non-interlinked region during the three-dimensional weaving.

17. A method according to claim 11, wherein the fiber blank is shaped by folding two halves of the fiber blank onto the shaping part.

18. A method according to claim 17, further comprising forming at least one stiffener-forming extra thickness on the facing faces of the two halves of the blank.

\* \* \* \* \*